US010077812B2

United States Patent
Hornbrook et al.

(10) Patent No.: US 10,077,812 B2
(45) Date of Patent: Sep. 18, 2018

(54) ELECTROMAGNETIC CLUTCH ASSEMBLY

(71) Applicant: Eaton Corporation, Cleveland, OH (US)

(72) Inventors: Michael J. Hornbrook, Orland, IN (US); Brian W. Franke, Hamilton, IN (US); Michael J. Warwick, Hickory Corners, MI (US); Mark C. Barnholt, Fort Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 290 days.

(21) Appl. No.: 14/933,130

(22) Filed: Nov. 5, 2015

(65) Prior Publication Data

US 2016/0053827 A1    Feb. 25, 2016

Related U.S. Application Data

(63) Continuation of application No. PCT/US2014/037536, filed on May 9, 2014.
(Continued)

(51) Int. Cl.
*F16D 27/06*    (2006.01)
*F16D 27/12*    (2006.01)
(Continued)

(52) U.S. Cl.
CPC .............. *F16D 27/06* (2013.01); *F02B 39/12* (2013.01); *F16D 27/112* (2013.01); *F16D 27/14* (2013.01); *F16D 2027/008* (2013.01)

(58) Field of Classification Search
None
See application file for complete search history.

(56) References Cited

U.S. PATENT DOCUMENTS 5,551,546 A * 9/1996 Tabayama ............. F16D 27/112
                                                    192/84.96
6,591,477 B1    7/2003 Licari
(Continued)

FOREIGN PATENT DOCUMENTS

JP    2012177371    9/2012
JP    2012233568    11/2012

OTHER PUBLICATIONS

International Search Report and Written Opinion for International Application No. PCT/US2014/037536 dated Aug. 19, 2014 (10 pages).

*Primary Examiner* — Colby M Hansen
(74) *Attorney, Agent, or Firm* — RMCK Law Group PLC

(57) ABSTRACT

An electromagnetic clutch assembly includes a rotor assembly operable to rotate about an axis. The electromagnetic clutch assembly also includes an armature assembly operable to rotate about the axis. The electromagnetic clutch assembly also includes an electromagnetic coupling system operable to generate a magnetic field. The magnetic field induces the rotor assembly and the armature assembly against one another along the axis for frictional engagement such that the rotor assembly and the armature assembly rotate together. The electromagnetic clutch assembly also includes an air gap defined between the rotor assembly and the armature assembly when the rotor assembly and the armature assembly are in frictional engagement. In another implementation, at least one plate is positioned between the rotor assembly and the armature assembly such that magnetic flux passes through the at least one plate. The plate is formed from a mixture of powdered metal and solid lubricant.

20 Claims, 5 Drawing Sheets

Related U.S. Application Data

(60) Provisional application No. 61/831,886, filed on Jun. 6, 2013, provisional application No. 61/831,123, filed on Jun. 4, 2013, provisional application No. 61/821,709, filed on May 9, 2013.

(51) Int. Cl.
*F16D 27/14* (2006.01)
*F02B 39/12* (2006.01)
*F16D 27/112* (2006.01)
*F16D 27/00* (2006.01)

(56) References Cited

U.S. PATENT DOCUMENTS

| | | | |
|---|---|---|---|
| 7,017,726 B2 * | 3/2006 | Konishi | F16D 27/112 192/84.961 |
| 7,540,365 B2 * | 6/2009 | Juergensmeyer | F16D 27/112 192/84.2 |
| 7,592,890 B2 * | 9/2009 | Aikawa | F16D 27/115 192/84.1 |
| 2012/0037473 A1 | 2/2012 | Ouwenga | |
| 2012/0097496 A1 | 4/2012 | Greene | |

* cited by examiner

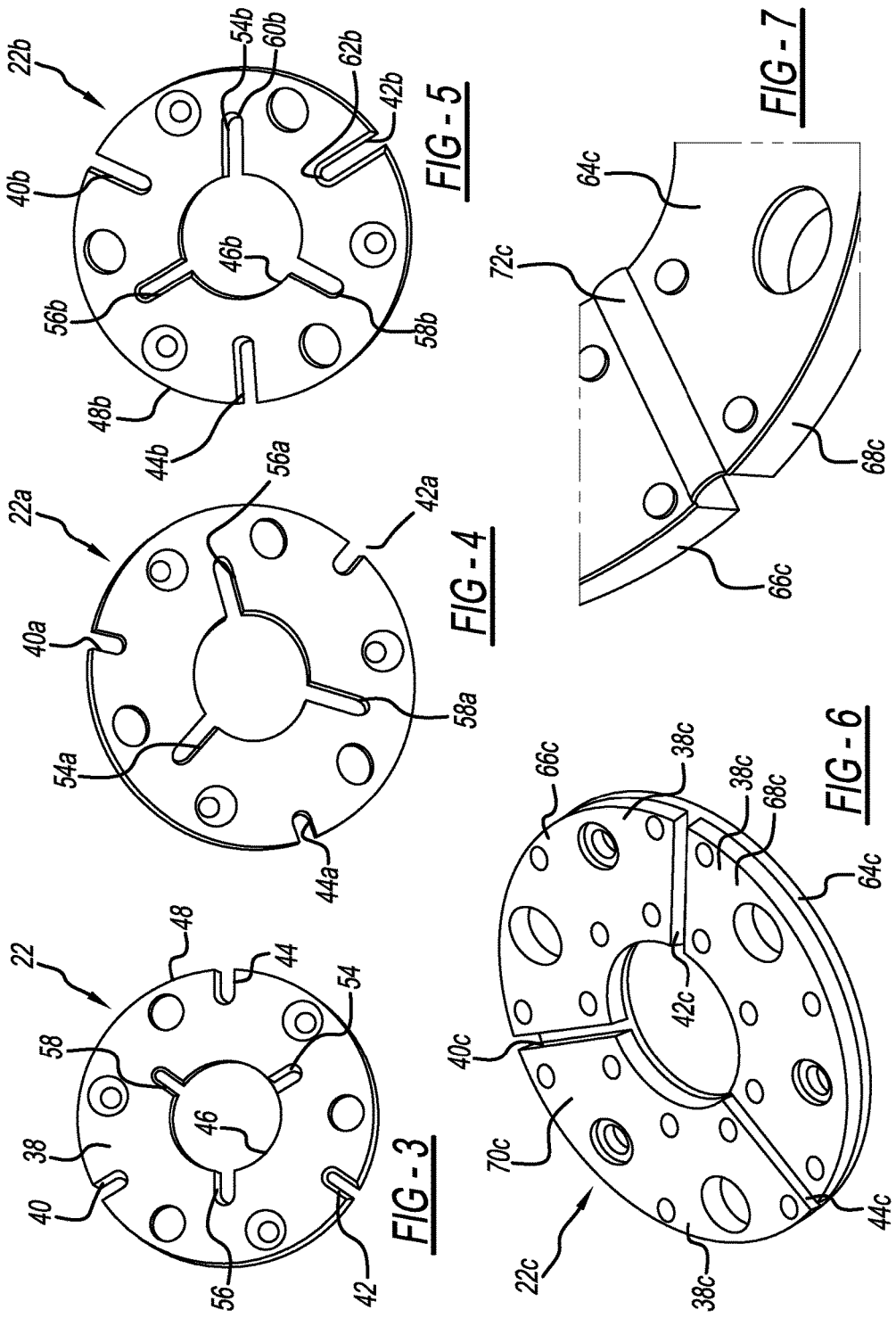

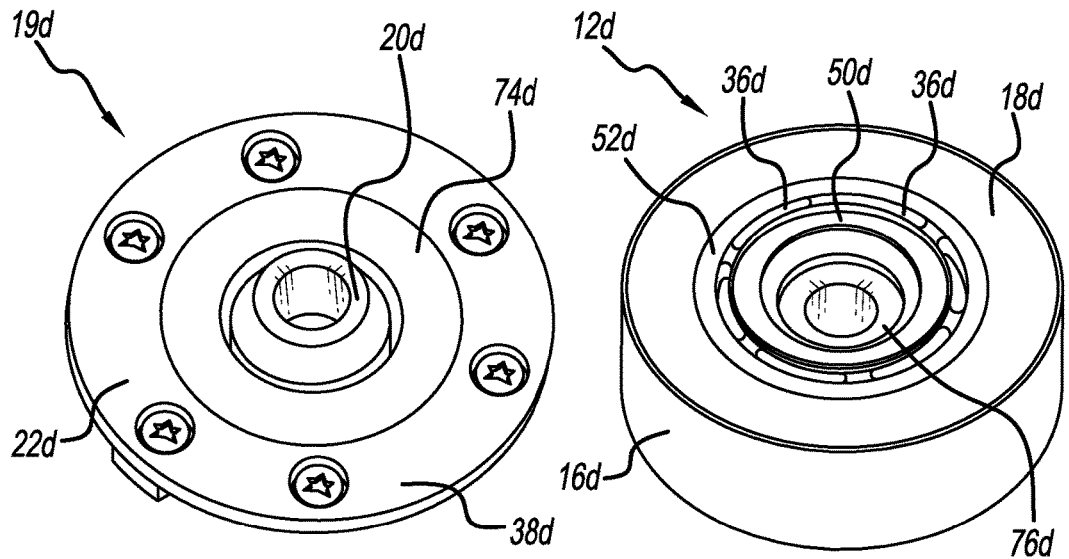
FIG - 8
FIG - 9
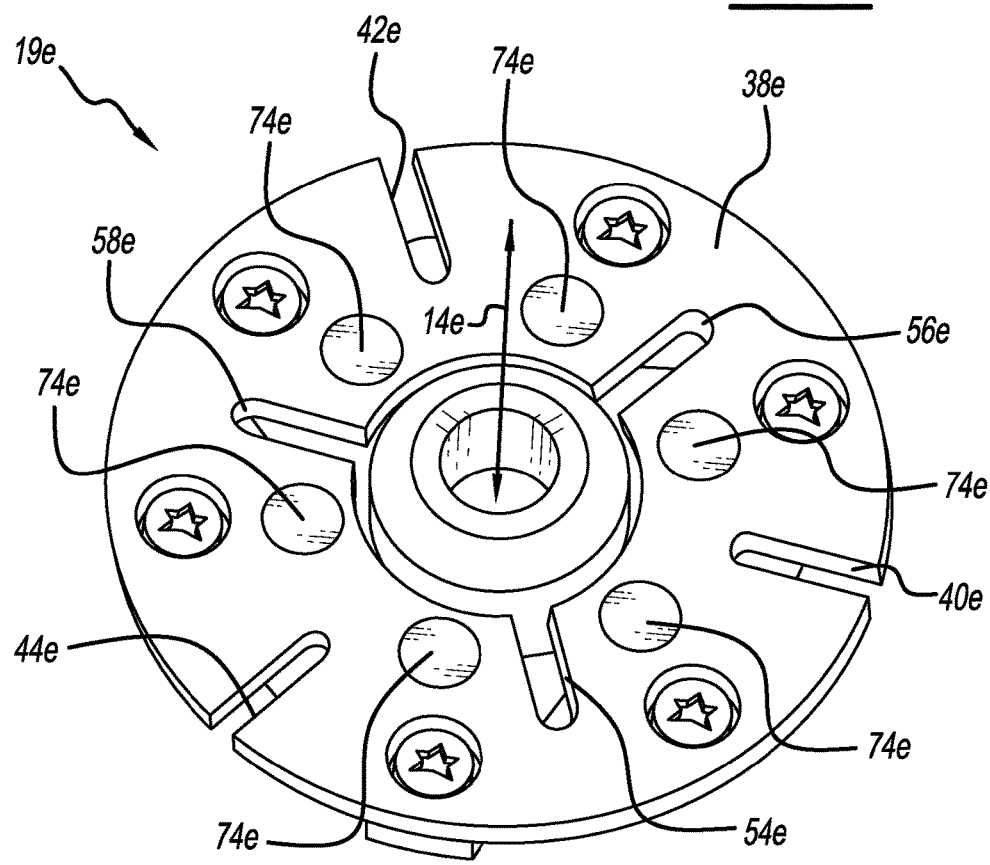
FIG - 10

ELECTROMAGNETIC CLUTCH ASSEMBLY

CROSS-REFERENCE TO RELATED APPLICATION

This application is a continuation of International Patent Application No. PCT/US2014/037536 filed on May 9, 2014, which claims the benefit of U.S. Patent Application No. 61/821,709 filed on May 9, 2013; U.S. Patent Application No. 61/831,123 filed on Jun. 4, 2013; and U.S. Patent Application No. 61/831,886 filed on Jun. 6, 2013. The disclosures of the above applications are incorporated herein by reference.

FIELD

The present disclosure relates generally to superchargers and, more particularly, to an electromagnetic clutch assembly for a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other and, therefore, are driven by meshed timing gears which are potentially subject to conditions such as gear rattle and bounce. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine.

Superchargers such as the Roots-type blower can include electromagnetic clutch assemblies, which include armature assemblies. Typical armature assemblies incorporate a single armature plate. These single plates can be prone to dust buildup. Excess dust can accumulate on the armature plate which could lead to premature clutch wear. Clutch dust can also lead to loss of torque capacity, stick/slip conditions, and noise. Single armature plates can also be susceptible to distortion due to the heat generated during engagement of the supercharger.

The background description provided herein is for the purpose of generally presenting the context of the disclosure. Work of the presently-named inventors, to the extent it is described in this background section, as well as aspects of the description that may not otherwise qualify as prior art at the time of filing, are neither expressly nor impliedly admitted as prior art against the present disclosure.

SUMMARY

In one exemplary implementation, an electromagnetic clutch assembly includes a rotor assembly operable to rotate about an axis. The electromagnetic clutch assembly also includes an armature assembly operable to rotate about the axis. The electromagnetic clutch assembly also includes an electromagnetic coupling system operable to generate a magnetic field. The magnetic field induces the rotor assembly and the armature assembly against one another along the axis for frictional engagement such that the rotor assembly and the armature assembly rotate together. The electromagnetic clutch assembly also includes an air gap defined between the rotor assembly and the armature assembly when the rotor assembly and the armature assembly are in frictional engagement.

In another exemplary implementation, an electromagnetic clutch assembly includes a rotor assembly operable to rotate about an axis. The electromagnetic clutch assembly also includes an armature assembly operable to rotate about the axis. The electromagnetic clutch assembly also includes an electromagnetic coupling system operable to generate a magnetic field. The magnetic field induces the rotor assembly and the armature assembly against one another along the axis for frictional engagement such that the rotor assembly and the armature assembly rotate together. At least one plate is positioned between the rotor assembly and the armature assembly such that magnetic flux passes through the at least one plate. The plate is formed from a mixture of powdered metal and solid lubricant.

BRIEF DESCRIPTION OF THE DRAWINGS

The present disclosure will become more fully understood from the detailed description and the accompanying drawings, wherein:

FIG. 3 is a planar view of an armature plate of the electromagnetic clutch assembly shown in FIG. 1;

FIG. 4 is a planar view of an armature plate of an electromagnetic clutch assembly constructed in accordance to another example of the present disclosure;

FIG. 5 is a planar view of an armature plate of an electromagnetic clutch assembly constructed in accordance to another example of the present disclosure;

FIG. 6 is a front perspective view of an armature plate and backing plate of an electromagnetic clutch assembly constructed in accordance to another example of the present disclosure;

FIG. 7 is a rear perspective view of a portion of the structure shown in FIG. 6;

FIG. 8 is a perspective view of an armature assembly constructed in accordance to another example of the present disclosure;

FIG. 9 is a perspective view of a rotor assembly constructed in accordance to another example of the present disclosure;

FIG. 10 is a perspective view of an armature assembly constructed in accordance to another example of the present disclosure;

DETAILED DESCRIPTION

Figure 1:
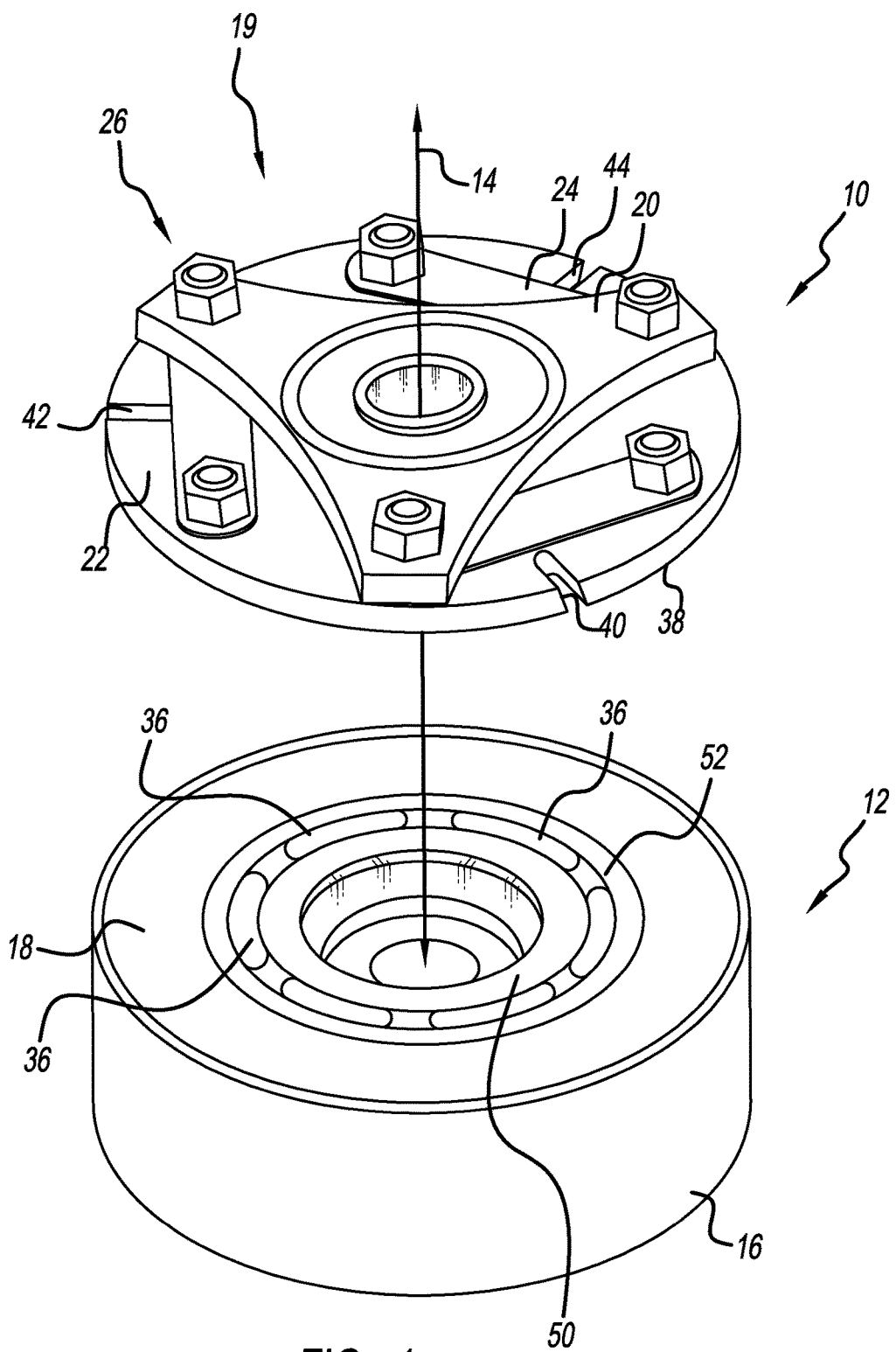
FIG. 1 is a front perspective view of an electromagnetic clutch assembly for a supercharger according to one example of the present disclosure.

A plurality of different embodiments of the present disclosure is shown in the Figures of the application. Similar features are shown in the various embodiments of the present disclosure. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

FIG. 1 is a front perspective view of an electromagnetic clutch assembly 10 for a supercharger according to one example of the present disclosure. In one exemplary implementation, the electromagnetic clutch assembly 10 includes a rotor assembly 12 operable to rotate about an axis 14. The exemplary rotor assembly 12 includes a rotor 16 and a friction plate 18. The friction plate 18 can be press-fit in a circumferential channel defined by the rotor 16.

The electromagnetic clutch assembly 10 also includes an armature assembly 19 operable to rotate about the axis 14. The exemplary armature assembly 19 can include a hub 20 and an armature plate 22. The hub 20 and the armature plate 22 can be interconnected through ribbon-like springs 24 and fasteners 26.

Figure 2:
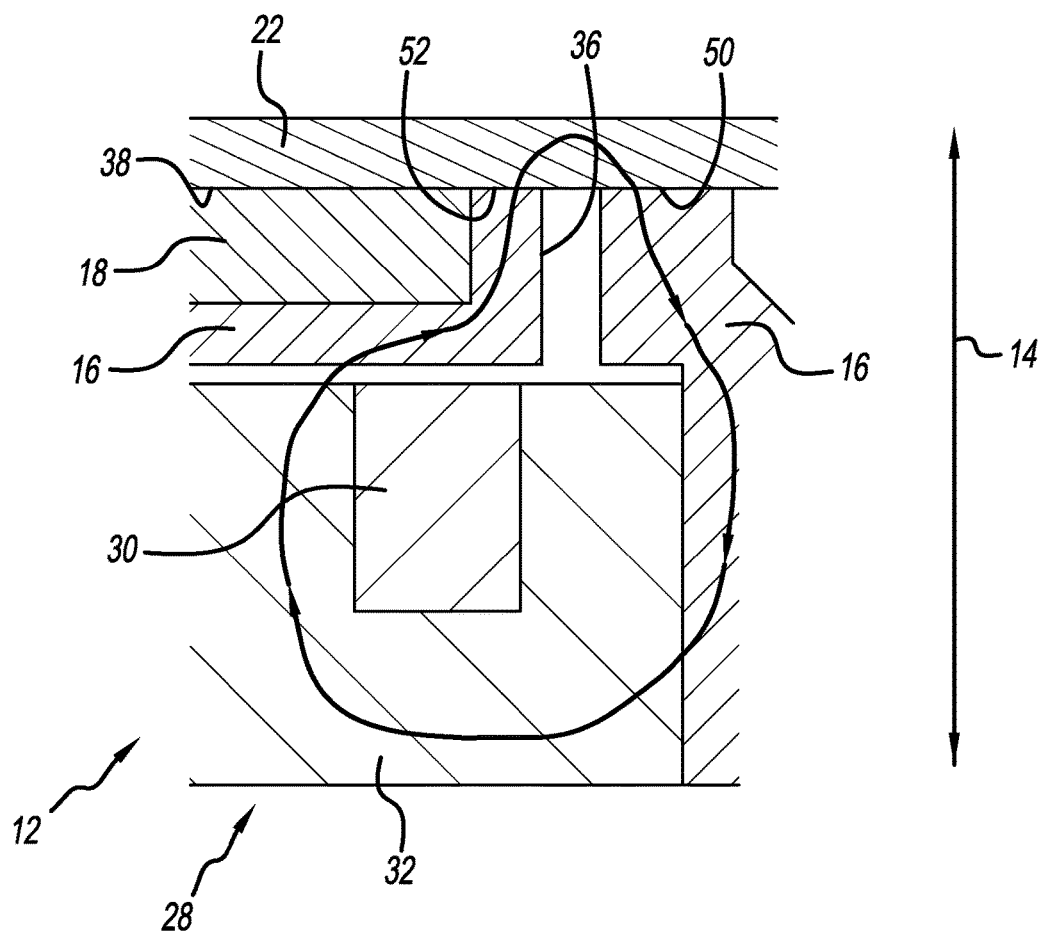
FIG. 2 is a cross-sectional view taken through a rotor assembly shown in FIG. 1.

FIG. 2 is a cross-sectional view taken through the rotor assembly 12 shown in FIG. 1. FIG. 2 also shows a portion of the armature plate 22. The electromagnetic clutch assembly 10 also includes an electromagnetic coupling system 28 operable to generate a magnetic field. The electromagnetic coupling system 28 is disposed internal of the rotor assembly 12 in the exemplary implementation. The electromagnetic coupling system 28 can include a coil 30 and a magnetic assembly shell 32. In operation, the magnetic field generated by the electromagnetic coupling system 28 induces the rotor assembly 12 and the armature assembly 19 against one another along the axis 14 for frictional engagement such that the rotor assembly 12 and the armature assembly 19 rotate together.

The magnetic flux can travel in a loop, passing through the metallic rotor 16 and the metallic armature plate 22. An exemplary and simplified path of the flux is referenced at 34. The rotor 16 can define one or more slots 36. The slots 36 ensure that the magnetic flux passes through the armature plate 22 and does not "short" through the rotor 16. The magnetic field can urge the armature plate 22, which can be moveable relative to the rotor assembly 12, against the friction plate 18 and the rotor 16. The armature plate 22 includes an armature engaging surface 38 engaging the rotor assembly 12 when the rotor assembly 12 and the armature assembly 19 are in frictional engagement. The electromagnetic clutch assembly 10 is locked when this occurs. When the electromagnetic coupling system 28 is disengaged, the rotor assembly 12 and the armature assembly 19 can rotate relative to one another.

Referring again to FIG. 1, the electromagnetic clutch assembly 10 also includes an air gap defined between the rotor assembly 12 and the armature assembly 19 when the rotor assembly 12 and the armature assembly 19 are in frictional engagement. The air gap can be at least one slot extending radially with respect to the axis 14 through the armature engaging surface 38. In the first exemplary embodiment, slots 40, 42, 44 are defined in the armature engaging surface 38.

FIG. 3 is a planar view of the armature plate 22. The armature engaging surface 38 extends a width between a radially-inner edge 46 and a radially-outer edge 48. The slots 40, 42, 44 extend radially inward less than the width of the armature engaging surface 38. The slots 40, 42, 44 intersect the radially-outer edge 48. The dust generated during engagement of the electromagnetic clutch assembly 10 can collect in the slots 40, 42, 44.

Referring again to FIGS. 1 and 2, collecting dust in the slots 40, 42, 44 reduces the likelihood that a layer of dust will form on surfaces 50, 52 of the rotor 16. The surfaces 50, 52 frictionally engage the armature engaging surface 38 when the electromagnetic clutch assembly 10 is engaged. This engagement is metal-to-metal. If dust has accumulated on the surfaces 50, 52, the electromagnetic clutch assembly 10 may experience "stick-slip," a condition in which frictional engagement between the rotor assembly 12 and the armature assembly 19 is inconsistent.

Referring again to FIG. 3, the armature plate 22 also includes slots 54, 56, 58, which intersect the radially-inner edge 46. In various embodiments of the present disclosure, the radial lengths of the slots can be varied to enhance dust collection in various operating environments. For example, the slots 40, 42, 44, 54, 56, 58 have a common radial length.

FIG. 4 is a planar view of an armature plate 22a constructed in accordance to another example of the present disclosure. Slots 40a, 42a, 44a have different radial lengths than slots 54a, 56a, 58a. The armature plate 22a can be practiced, for example, in operating environments wherein the extent of metal-to-metal contact (such as between a rotor and an armature plate) is relatively greater than in other operating environments.

FIG. 5 is a planar view of an armature plate 22b constructed in accordance to another example of the present disclosure. The slots 40b, 42b, 44b intersect the radially-outer edge 48b, and the slots 54b, 56b, 58b intersect the radially-inner edge 46b. The slots 40b, 42b, 44b radially overlap the slots 54b, 56b, 58b. In other words, a distal end 60b of the slot 54b is radially spaced from a center of the armature plate 22b greater than or substantially the same as a distal end 62b of the slot 42b. The armature plate 22b can be practiced, for example, in operating environments wherein the rate of dust generation is relatively greater than in other operating environments.

FIG. 6 is a front perspective view of an armature plate 22c and backing plate 64c in accordance to another example of the present disclosure. The armature plate 22c includes a plurality of pucks 66c, 68c, and 70c. Each of the pucks 66c, 68c, 70c defines a portion of the armature engaging surface 38c. Slots 40c, 42c, 44c extend between adjacent pucks 66c, 68c, 70c. FIG. 7 is a rear perspective view of the armature plate 22c and backing plate 64c. The backing plate 64c is coined along the slots 40c, 42c, 44c. The coined feature enhances the resistance of the backing plate 64c to distortion and is referenced at 72c.

Another embodiment of an electromagnetic clutch assembly according to the present disclosure is shown in FIGS. 8 and 9. FIG. 8 is a perspective view of an armature assembly 19d, and FIG. 9 is a perspective view of a rotor assembly 12d. The armature assembly 19d includes a hub 20d and an armature plate 22d. The rotor assembly 12d includes a rotor 16d with a hub 76d, surfaces 50d, 52d, and slots 36d. A friction plate 18d can be press-fit in a circumferential channel defined by the rotor 16d.

The electromagnetic clutch assembly includes a plate 74d positioned between the rotor assembly 12d and the armature assembly 19d such that magnetic flux passes through the plate 74d. The plate 74d is ring-shaped and fixed to the armature assembly 19d. The plate 74d can be press-fit in a circumferential channel defined by the armature plate 22d.

The armature engaging surface 38d radially circumscribes the plate 74d. The plate 74d can be formed from a mixture of powdered metal and solid lubricants. The powdered metal and solid lubricants can be blended, compacted and sintered to form the plate 74d. Polyphenyl ether, moly disulfide, or other materials can be the solid lubricant used in forming the plate 74d.

An electromagnetic clutch assembly formed with the rotor assembly 12d and the armature assembly 19d can substantially eliminate fully metal-to-metal contact. The armature plate 22d can engage the non-metallic or non-ferric friction plate 18d. The surfaces 50d, 52d of the rotor 16d engage the plate 74d having solid lubricant. Thus, the likelihood of the stick-slip that can occur in metal-to-metal frictional engagements is reduced.

FIG. 10 is a perspective view of an armature assembly 19e constructed in accordance to another example of the present disclosure. The plate 74d shown in FIG. 8 has been replaced with a plurality of plates 74e positioned about the axis 14e. The armature assembly 19e includes an armature engaging surface 38e with a plurality of slots 40e, 42e, 44e, 54e, 56e, 58e extending radially. The plurality of plates 74e are fixed to the armature assembly 19e and are positioned in alternating relation with the plurality of slots 40e, 42e, 44e, 54e, 56e, 58e.

Figure 11:
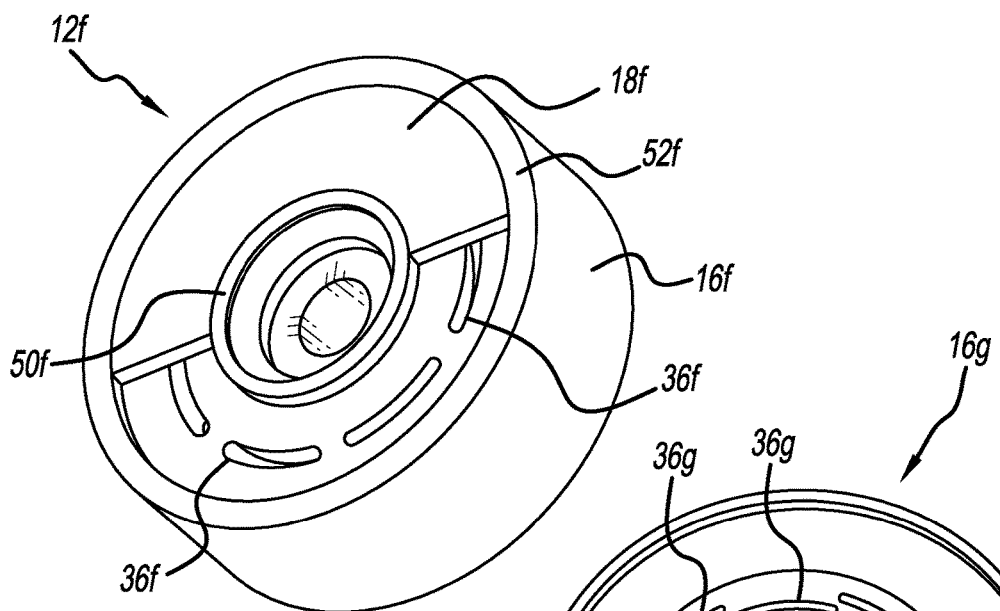
FIG. 11 is a perspective view of a rotor assembly constructed in accordance to another example of the present disclosure.

FIG. 11 is a perspective view of a rotor assembly 12f constructed in accordance to another example of the present disclosure. The rotor assembly 12f includes a rotor 16f with surfaces 50f, 52f and slots 36f. A friction plate 18f can be press-fit in a circumferential channel defined by the rotor 16f. The slots 36f are arranged around a circle shifted radially outward, compared to the other disclosed embodiments. The slots 36f are thus aligned with a center of the engagement area between an armature plate (not shown) and the friction plate 18f. This arrangement enhances uniform loading.

Figure 12:
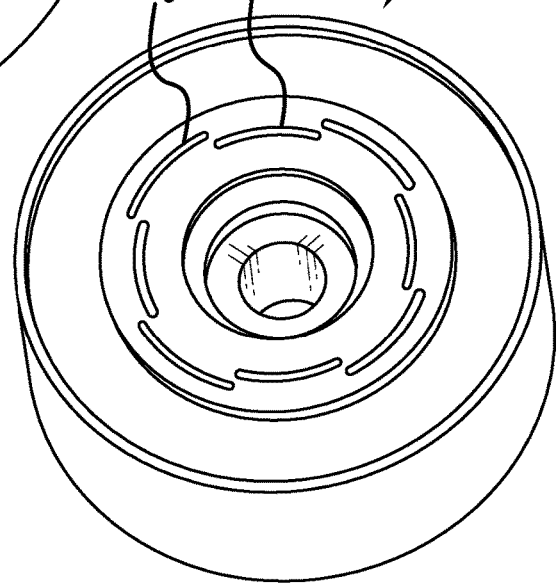
FIG. 12 is a perspective view of a rotor constructed in accordance to another example of the present disclosure.

FIG. 12 is a perspective view of a rotor 16g constructed in accordance to another example of the present disclosure. Slots 36g are formed in the rotor 16g. As shown in the FIG., the slots 36g are staggered such that adjacent slots 36g are spaced radially-different from one another. This arrangement allows for a magnetic flux path and also alleviates stress concentrations.

Figure 13:
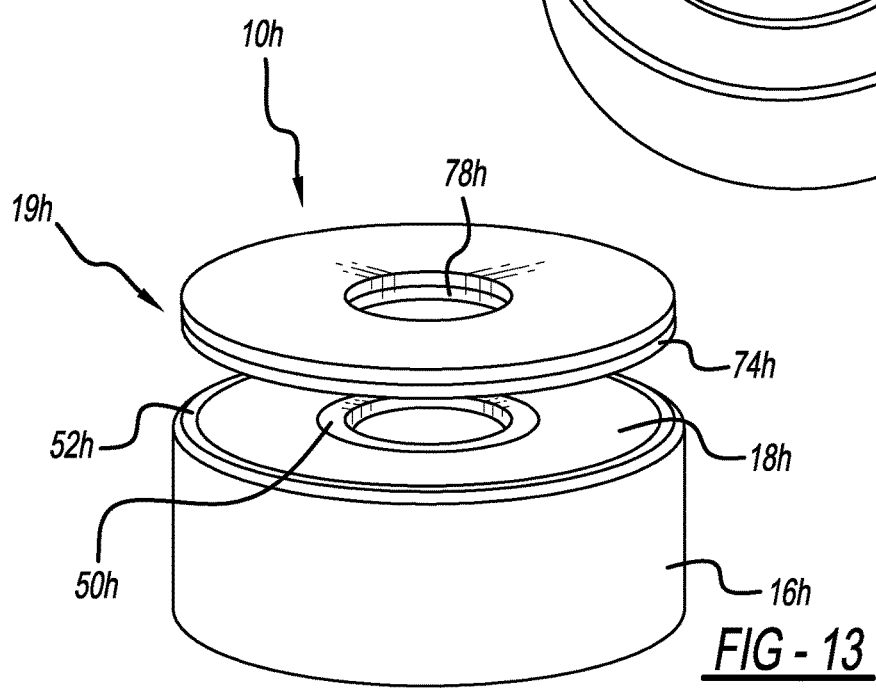
FIG. 13 is a perspective view of an electromagnetic clutch assembly for a supercharger constructed in accordance to another example of the present disclosure.

FIG. 13 is a perspective view of an electromagnetic clutch assembly 10h for a supercharger constructed in accordance to another example of the present disclosure. In this embodiment, two plates 74h and 78h, each formed with powdered metal and solid lubricant, are mounted on an armature assembly 19h. An armature engaging surface (not visible) extends between the two plates 74h and 78h and engages a friction plate 18h mounted on a rotor 16h. A surface 50h of the rotor 16h defines an inner magnetic pole for the passage of flux and a surface 52h of the rotor 16h defines an outer magnetic pole for the passage of flux. As with the embodiment shown in FIGS. 8 and 9, the fully metal-to-metal contact is eliminated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electromagnetic clutch assembly comprising:
   a rotor assembly operable to rotate about an axis;
   an armature assembly operable to rotate about the axis, the armature assembly including an armature plate having an armature engaging surface engaging the rotor assembly when the rotor assembly and the armature assembly are in frictional engagement, wherein at least one slot extends radially with respect to the axis through the armature engaging surface, wherein the armature engaging surface extends a width between a radially-inner edge and a radially-outer edge and wherein the at least one slot extends radially less than the width;
   an electromagnetic coupling system operable to generate a magnetic field and wherein the magnetic field induces the rotor assembly and the armature assembly against one another along the axis for frictional engagement such that the rotor assembly and the armature assembly rotate together; and
   an air gap defined between the rotor assembly and the armature assembly when the rotor assembly and the armature assembly are in frictional engagement.

2. The electromagnetic clutch assembly of claim 1 wherein the at least one slot intersects the radially-inner edge.

3. The electromagnetic clutch assembly of claim 1 wherein the at least one slot intersects the radially-outer edge.

4. The electromagnetic clutch assembly of claim 1 wherein the armature plate further comprises:
   a plurality of pucks each defining a portion of the armature engaging surface, wherein the at least one slot extends between adjacent pucks.

5. The electromagnetic clutch assembly of claim 4 wherein the armature plate further comprises:
   a backing plate, the plurality of pucks fixed to the backing plate, wherein the backing plate is coined along the at least one slot.

6. The electromagnetic clutch assembly of claim 1 wherein the at least one slot is further defined as a plurality of slots.

7. The electromagnetic clutch assembly of claim 6 wherein the armature engaging surface extends a width between a radially-inner edge and a radially-outer edge and wherein at least some of the plurality of slots intersect the radially-inner edge.

8. The electromagnetic clutch assembly of claim 6 wherein the armature engaging surface extends a width between a radially-inner edge and a radially-outer edge and wherein at least some of the plurality of slots intersect the radially-outer edge.

9. The electromagnetic clutch assembly of claim 6 wherein the armature engaging surface extends a width between a radially-inner edge and a radially-outer edge and wherein at least some of the plurality of slots intersect the radially-inner edge and at least some of the plurality of slots intersect the radially-outer edge.

10. The electromagnetic clutch assembly of claim 9 wherein the plurality of slots intersecting the radially-inner edge and the plurality of slots intersecting the radially-outer edge radially overlap.

11. The electromagnetic clutch assembly of claim 6 wherein the plurality of slots have a common radial length.

12. The electromagnetic clutch assembly of claim 6 wherein the plurality of slots have different radial lengths.

13. An electromagnetic clutch assembly comprising:
a rotor assembly operable to rotate about an axis;
an armature assembly operable to rotate about the axis;
an electromagnetic coupling system operable to generate a magnetic field and wherein the magnetic field induces the rotor assembly and the armature assembly against one another along the axis for frictional engagement such that the rotor assembly and the armature assembly rotate together; and
at least one plate positioned between the rotor assembly and the armature assembly such that magnetic flux passes through the at least one plate, the plate formed from a mixture of powdered metal and solid lubricant.

14. The electromagnetic clutch assembly of claim 13 wherein the at least one plate is ring-shaped and fixed to the armature assembly.

15. The electromagnetic clutch assembly of claim 14 wherein the armature assembly includes an armature engaging surface radially circumscribing the at least one plate, the armature engaging surface directly engaging the rotor assembly when the rotor assembly and the armature assembly are in frictional engagement.

16. The electromagnetic clutch assembly of claim 15 wherein the rotor assembly further comprises:
a rotor defining a hub; and
a friction plate fixed to the hub and circumscribing the hub, the hub frictionally engaging the at least one plate and the friction plate frictionally engaging the armature engaging surface when the rotor assembly and the armature assembly are in frictional engagement.

17. The electromagnetic clutch assembly of claim 13 wherein the at least one plate is further defined as a plurality of plates positioned about the axis.

18. The electromagnetic clutch assembly of claim 17 wherein the armature assembly includes an armature engaging surface with a plurality of slots extending radially with respect to the axis through the armature engaging surface, the plurality of plates fixed to the armature assembly and positioned in alternating relation with the plurality of slots.

19. An electromagnetic clutch assembly comprising:
a rotor assembly operable to rotate about an axis;
an armature assembly operable to rotate about the axis, the armature assembly including an armature plate having an armature engaging surface engaging the rotor assembly when the rotor assembly and the armature assembly are in frictional engagement, wherein at least one slot extends radially with respect to the axis through the armature engaging surface, wherein the armature plate comprises a plurality of pucks each defining a portion of the armature engaging surface, wherein the at least one slot extends between adjacent pucks;
an electromagnetic coupling system operable to generate a magnetic field and wherein the magnetic field induces the rotor assembly and the armature assembly against one another along the axis for frictional engagement such that the rotor assembly and the armature assembly rotate together; and
an air gap defined between the rotor assembly and the armature assembly when the rotor assembly and the armature assembly are in frictional engagement.

20. An electromagnetic clutch assembly comprising:
a rotor assembly operable to rotate about an axis;
an armature assembly operable to rotate about the axis, the armature assembly including an armature plate having an armature engaging surface engaging the rotor assembly when the rotor assembly and the armature assembly are in frictional engagement, wherein a plurality of slots extend radially with respect to the axis through the armature engaging surface;
an electromagnetic coupling system operable to generate a magnetic field and wherein the magnetic field induces the rotor assembly and the armature assembly against one another along the axis for frictional engagement such that the rotor assembly and the armature assembly rotate together; and
an air gap defined between the rotor assembly and the armature assembly when the rotor assembly and the armature assembly are in frictional engagement.

* * * * *